United States Patent Office 3,388,533
Patented June 18, 1968

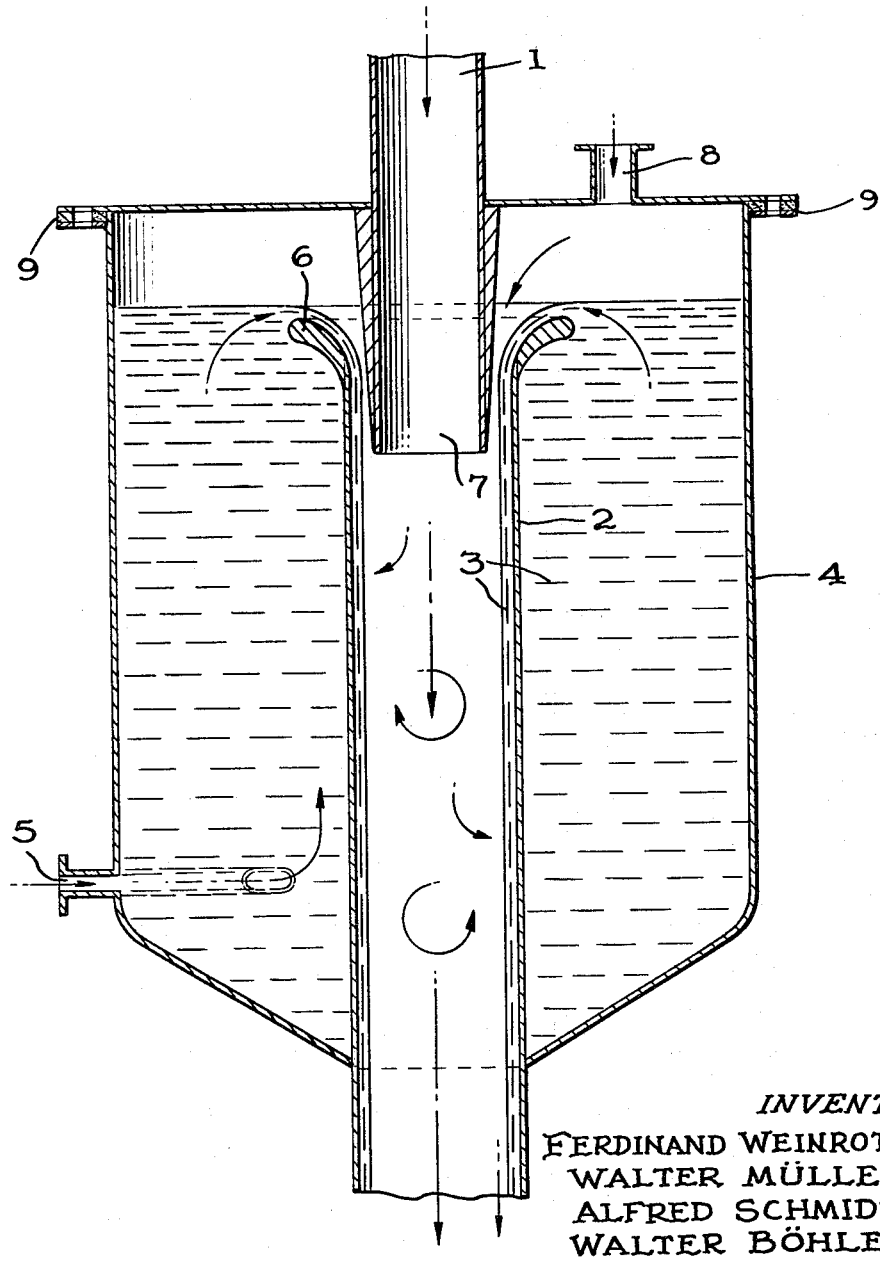

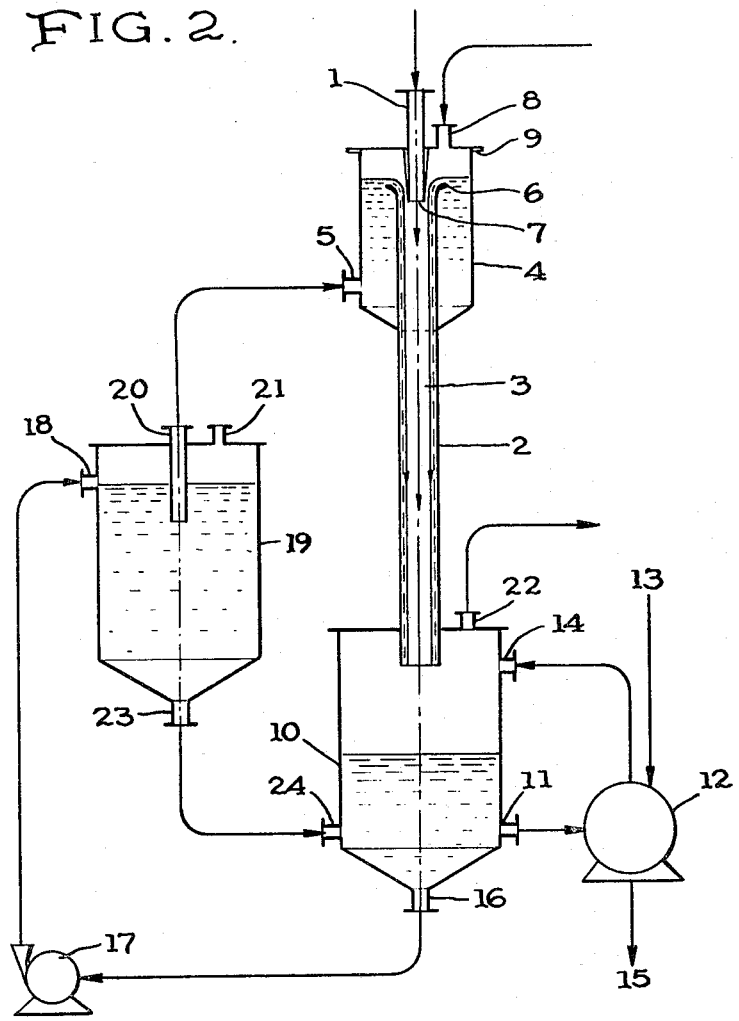

3,388,533
PROCESS FOR THE PREPARATION
OF MELAMINE
Ferdinand Weinrotter, Linz, Walter Müller, Leonding, near Linz, and Alfred Schmidt, Walter Böhler, Johann Schweighofer, and Wilfried Krulla, Linz, Austria, assignors to Osterreichische Stickstoffwerke Aktiengesellschaft, Linz, Austria
Filed Jan. 11, 1965, Ser. No. 424,716
Claims priority, application Austria, Jan. 14, 1964, A 236/64
2 Claims. (Cl. 55—82)

ABSTRACT OF THE DISCLOSURE

Pure melamine is recovered directly and without the necessity of recrystallization, from the hot reaction gas from a catalytic melamine synthesis at normal pressure, by contacting the hot reaction gas mixture directly and exclusively with the continuously renewed surface of a flowing film of aqueous absorbent cooling liquid (e.g. aqueous melamine suspension), and recovering the melamine from the resultant aqueous suspension thereof.

---

This invention relates to a method for the preparation of pure melamine.

Methods of producing melamine from urea or, more recently, from cyanic acid and ammonia have been described in the patent literature. In these catalytic melamine syntheses under atmospheric or elevated pressure the melamine that forms at the catalyst is carried out of the reactor principally by sublimation by the hot reaction gases which are then cooled for the recovery of the solid melamine. The raw melamine thus obtained is impure and therefore recrystallization from water is required to transform the product into a sufficiently pure state for sale. Owing to the low solubility of melamine (at 100° C.=51.4 g./litre, at 20° C.=3.3 g./litre) this requires a large and costly plant. Even purification by recrystallization from the hot aqueous solution is not sufficiently satisfactory unless the insoluble impurities are removed from the hot aqueous solution by filtration, and the remaining impurities such as ammeline, ammelide and melamine cyanurate, are retained in solution in the form of their sodium salts when the solution is cooled and the melamine is precipitated. Another complication involved in recrystallization is the rapid accumulation of impurities in the mother liquor, as a result of which a considerable proportion of liquor must be continually discarded.

There has been no lack of proposals aimed at circumventing the need for special crystallization equipment in the production of pure melamine. For instance, it has been proposed to treat the gas mixture from the reactor with mother liquor and fresh water in a separator, to remove the ammonia and carbon dioxide from the melamine solution thus obtained in a rectifying column, and, after filtration for the removal of the impurities, to cool and crystallize the solution in a vacuum apparatus. This process is therefore likewise a crystallization process in the proper sense of the term, information relating to the mother liquor not being disclosed.

Another proposal involves precipitation of the melamine from the hot reaction gases on cooled metal walls or in a fluidized layer of melamine crystals at temperatures between 200° and 275° C. This is a process which presents considerable practical difficulties, principally because of the problem of the cooling surfaces becoming encrusted.

Considerable research into the problem has now unexpectedly revealed that the contamination of the precipitated raw melamine with impurities does not in fact occur until precipitation takes place. When melamine is synthesized from cyanic acid and ammonia gas, preferably under standard conditions, only gaseous melamine, carbon dioxide and ammonia besides unreacted cyanic acid are present in the hot reaction gas, provided the conditions of the synthesis are appropriately chosen. If the melamine is then precipitated in the conventional manner by cooling the hot reaction gas by contact with cooled surfaces or other parts of the apparatus, then the cyanic acid which is still present in the reaction gas reacts with the ammonia to form solid ammonium cyanate. In the existing conditions this immediately changes into urea which in turn, at temperatures above 120° C., undergoes further reactions leading to the formation of, for example, biuret, cyanuric acid, ammelide, ammeline and melamine cyanurate.

The last named secondary products of thermal urea reactions always appear when solids or incrustations are formed and these solids have an opportunity of reacting by thermal decomposition to produce the above mentioned impurities in the raw melamine. Since in practice the percentage of conversion in the synthesis of melamine never reaches 100%; some cyanic acid, even if only in small quantities, is always present in the reaction gas, and this cyanic gas then gives rise to the undesirable contamination of the raw melamine caused by the described reactions.

The process of the present invention prevents the formation of secondary products during the precipitation of melamine directly from the synthesis reaction gas mixture which still contains cyanic acid, carbon dioxide and ammonia, and enables a pure melamine of saleable quality which does not require recrystallization, to be recovered from the hot gaseous phase.

In accordance with this invention there is provided a process for the recovery of pure melamine, without crystallization, directly from the hot reaction gas from a catalytic melamine synthesis at normal pressure, which comprises contacting the hot reaction gas mixture directly and exclusively with the continuously renewed surface of a flowing film of an aqueous absorbent cooling liquid and separating the melamine from the resulting aqueous suspension thereof.

The aqueous suspension resulting during the above process will contain the precipitated melamine in the form of a solid suspension and the absorbed cyanic acid in the form of urea in solution which as such will not then participate in further reactions.

In order to obtain a pure melamine by the proposed method of separation, it is an essential condition that at no point in the zone for cooling the reaction gas shall there be a transition temperature between the reaction gas temperature of 300° C. and the temperature under 100° C. of the aqueous phase, since at any such point solids would at once be deposited in the form of incrustations. These solid incrustations would decompose as has been described and contaminate the melamine.

The present invention also provides an apparatus for performing the above process, which comprises a closed tank forming a reservoir for a liquid and having an inlet pipe for introducing liquid into the reservoir, an inlet for the introduction of an inert gas into the space above the liquid level in the reservoir, an absorption tube extending coaxially inside the tank and having a flared funnel-shaped mouth which determines the upper level of any liquid in the reservoir and which is adapted to receive the open end of an extended admission pipe for hot reaction gas, which admission pipe is adapted to project into and beyond the mouth of the absorption tube, the difference in cross-section between the admission pipe and the absorption tube being such that the clearance between the inside wall of the absorption tube and the outside wall of the admission pipe does not substantially exceed the thickness of a liquid film which can be made to flow down the inside wall of the absorption tube when the liquid in the reservoir flows over the mouth of the tube.

The invention further provides a plant which incorporates the above apparatus and also includes means for separating melamine from the aqueous suspension produced in the absorption tube and means for recycling clarified liquor to the liquid inlet of the reservoir.

In the accompanying drawing FIG. 1 schematically and illustratively shows a preferred apparatus suitable for performing the process according to the invention, and FIG. 2 shows a preferred plant incorporating the said apparatus.

In FIG. 1 the hot reaction gas at a temperature exceeding 300° C. enters at the head of the apparatus through a centrally located admission pipe 1 which immediately discharges it into a slightly wider absorption tube 2. The entire inside surface of this wider tube is washed by a flowing film of an aqueous melamine suspension 3. The hot reaction gas is thereby instantaneously cooled to the temperature of the circulated liquid without intermediately making contact with any part of the apparatus upon which a solid incrustation could form. Tube 2 is immersed in a larger tank 4 containing the circulated solution which continuously enters at 5 and forms a film on the interior wall of tube 2 by flowing over the lip of its funnel-shaped mouth 6.

In order to prevent the hot reaction gas from being prematurely condensed in dry form, the end 7 of the gas admission pipe 1 projects a short distance into the absorption tube 2. Moreover, the external diameter of pipe 1 is so contrived that no significant clearance remains between the outside of the pipe and the film of liquid 3 flowing into tube 2. Furthermore, an inert flushing gas is forced in through the cover of the liquid tank 4 at 8 and thereby prevents hot reaction gas from escaping into the space above the overflow lip 6 of tube 2 and from forming deposits on the walls inside this space. The fitting flanges 9 between the wall of tank 4 and its cover are preferably likewise heat insulated by interposed layers.

The reaction gas is therefore cooled exclusively at the continuously self-renewing surface 3 of the liquid film in tube 2. The melamine separates at and in this film of liquid in the form of a finely crystalline powder which is entrained by the liquid without having an opportunity to form deposits or incrustations. In view of the large number of small crystal nuclei the suspension may be cooled to the desired temperature by external cooling means. Nevertheless, the process can be performed without external cooling in which case the temperature of the circulated liquid assumes an equilibrium temperature governed by the rate of evaporation of the water (for instance 75° C.). According to the temperature conditions and the composition of the reaction gas a slightly fluctuating ammonia-ammonium carbonate concentration in the mother liquor will result.

The removal of the separated melamine from the circulating suspension may be intermittently or continuously performed, and the incorporation of a hydrocyclone in the system provides the possibility of influencing the maximum grain size of the recovered product. Moreover, by varying the temperature conditions with the aid of external cooling means the size of the crystallites and hence the filtrability of the melamine is amenable to control. Whatever means are adopted, the recovered melamine, after having been dried, will always comply with the purity standards a pure melamine may be expected to fulfill.

If the volume of gas that emerges from the melamine contact reactor and requires cooling is very large, plant based on the principle of construction of the separator illustrated in FIG. 1 may be preceded as an intermediate piece of equipment by a standard separator, such as a Ströder washer, revolving spray washer or packed tower, provided contact between the hot gas and surfaces not wetted by liquid in such apparatus can be reliably prevented.

It is a surprising fact that even in continuous operation the melamine in the warm aqueous circulating suspension is hardly hydrolyzed to ammeline, ammelide or cyanic acid. On the other hand, the gaseous cyanic acid does undergo some degree of hydrolysis. This is in fact desirable, because the urea content of the circulated suspension will then rise only slowly, even if the residual cyanic acid content of the reaction gas is fairly high. In practice, concentrations of urea in the circulated liquor up to 15% have proved to be quite suitable for the recovery of a pure melamine. If this content of urea is exceeded, then some of the filtered circulated liquor must be discarded.

FIG. 2 of the accompanying drawings schematically and illustratively shows a complete plant according to the invention incorporating the apparatus shown in FIG. 1.

The aqueous melamine suspension 3 in the absorption tube 2 descends into a container 10 whence it is taken at 11 to a centrifuge 12. In the latter the melamine is washed with water 13 which is returned to container 10 at 14 together with the mother liquor. The moist melamine leaves the centrifuge at 15. For maintaining the circulation of the suspension the major proportion of the absorption liquor or melamine suspension is withdrawn from container 10 at 16 and transferred by a pump 17 into a second vessel 19 at 18. In this vessel a further quantity of solid melamine settles and this is returned via 23 and 24 to the settling zone in container 10. The supernatant liquor in vessel 19 is forced by the pumping pressure through 20 and 5 into the suspension tank 4. The exhaust gas, primarily consisting of ammonia, carbon dioxide and steam, is discharged from 22 and also from 21 if necessary.

The following example illustrates the process of the invention.

Example

The reaction gas mixture leaving a contact reactor at about 440° C., enters a separator designed as shown in FIG. 1 without being intermediately cooled. The temperature of the gas entry pipe and of the cover is about 400° C. so that no solids can be deposited in this zone. The gas volume (S.T.P.) is 3000 litres/h. The uncondensed reaction gas mixture contains in addition to ammonia and unreacted cyanic acid, 2.5% by vol. of melamine vapour and 7.6% by vol. of carbon dioxide gas. The volume of liquor circulated per hour is 1000 litres. The solid melamine is withdrawn from the circulating suspension intermittently once every 12 hours by separation in a centrifuge.

The melamine is practically quantitatively recovered from the reaction gas. Without external cooling the temperature of the circulating liquor adjusts itself to 70° C. The total volume of liquor is maintained at a constant level by introducing washing water into the centrifuge. The separated melamine is washed with as much water as is needed to make up the volume of liquor. The washed melamine is dried at 110° C. Its nitrogen content is 66.6% (theory: 66.64%). The product complies with the prescribed standards of purity with respect to the rate at which it dissolves and the clarity of its solution in formalin. The ammeline-ammelide content of the melamine is under 0.1% and its content of melamine cyanurate is under 0.01%.

We claim:
1. A process for the recovery of pure melamine, without recrystallization, from a hot gaseous mixture containing the same, which comprises contacting a gaseous reaction mixture heated to a temperature in excess of 300° C. and consisting essentially of gaseous melamine, carbon dioxide, ammonia and cyanic acid directly and exclusively with the continuously renewed surface of a flowing film of an aqueous absorbent cooling liquid and separating the melamine from the resulting aqueous suspension thereof.
2. A process according to claim 1, wherein the temperature of the aqueous cooling liquid is about 70° C., to about 100° C.

References Cited

UNITED STATES PATENTS

| | | | |
|---|---|---|---|
| 2,755,887 | 7/1956 | Boatright | 55—82 |
| 2,863,869 | 12/1958 | Elmer et al. | 260—249.7 |
| 3,112,352 | 11/1963 | Krantz | 55—241 X |
| 3,138,441 | 6/1964 | Krantz | 55—240 X |
| 3,138,442 | 6/1964 | Krantz | 55—240 X |
| 3,161,638 | 12/1964 | Christoffel et al. | 260—249.7 |
| 3,315,442 | 4/1967 | Yuan et al. | 55—82 X |

REUBEN FRIEDMAN, *Primary Examiner.*

J. ADEE, *Assistant Examiner.*